United States Patent [19]

Buckman et al.

[11] 4,161,667

[45] Jul. 17, 1979

[54] FLEXIBLE MOUNTING OF ELECTRIC MOTORS

[75] Inventors: John B. Buckman; Robert E. Lykes, both of Troy, Ohio

[73] Assignee: A. O. Smith Corporation, Milwaukee, Wis.

[21] Appl. No.: 851,962

[22] Filed: Nov. 16, 1977

[51] Int. Cl.² ............................................. H02K 5/24
[52] U.S. Cl. ........................................ 310/51; 310/91; 417/360; 248/603; 248/666
[58] Field of Search ....................... 310/51, 89, 91, 42; 248/15; 98/116; 415/108; 417/360, 363; 336/100

[56] References Cited

U.S. PATENT DOCUMENTS

| 2,615,620 | 10/1952 | Goettl | 248/15 |
|---|---|---|---|
| 2,936,140 | 5/1960 | Copeland | 310/51 UX |
| 3,127,092 | 3/1964 | Shenberger | 248/15 |
| 3,508,729 | 4/1970 | Wilson | 310/91 |
| 3,746,894 | 7/1973 | Dochterman | 310/51 |
| 4,063,060 | 12/1977 | Litch | 417/360 |
| 4,076,197 | 2/1978 | Dochterman | 417/363 |

*Primary Examiner*—R. Skudy
*Attorney, Agent, or Firm*—Andrus, Sceales, Starke & Sawall

[57] ABSTRACT

A mounting arrangement for supporting an electric motor within a blower housing which is an integral part of the electric motor supplied to the blower manufacturer and has a plurality of brackets secured in circumferentially spaced relation welded to the motor housing. The brackets each have an arm with a reverse bend which provides additional length to each bracket increasing the ability of the brackets to flex and isolate vibration of the motor from the blower housing.

3 Claims, 4 Drawing Figures

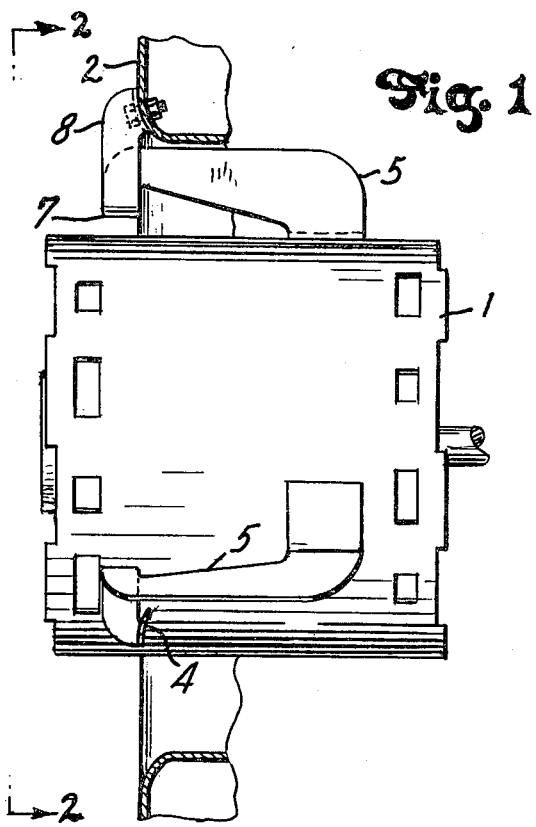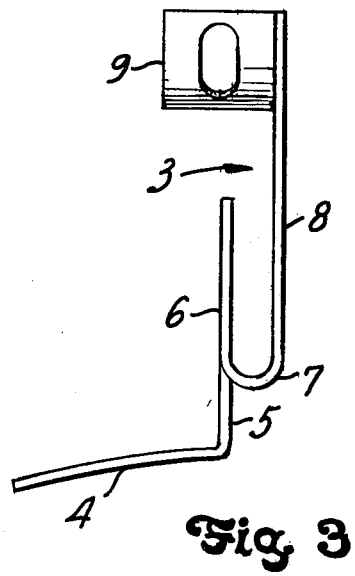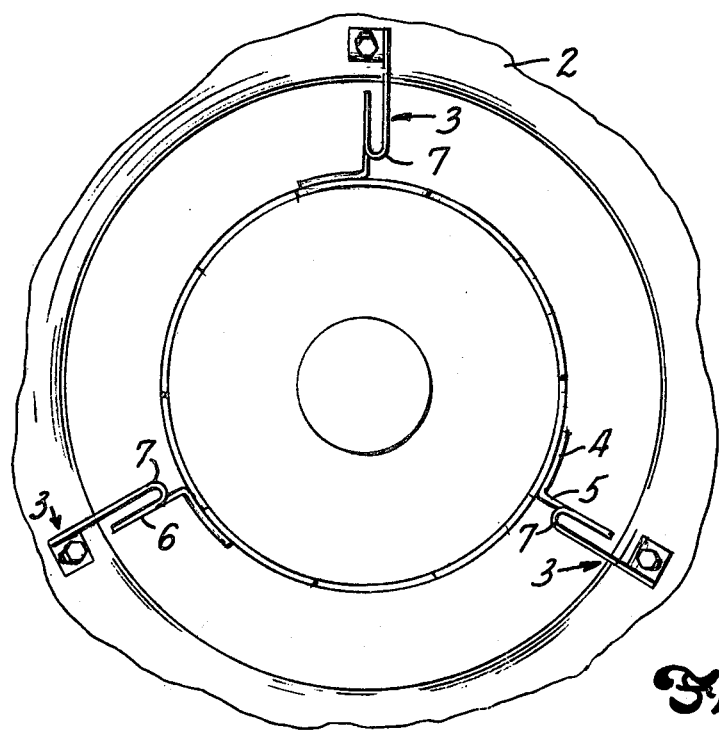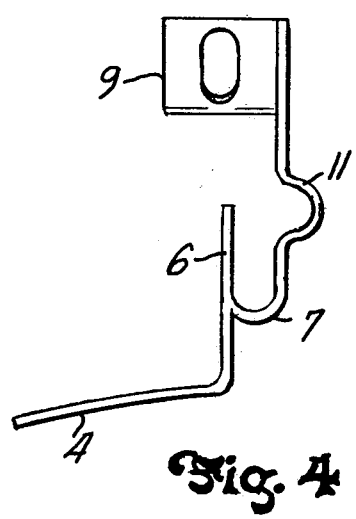

FLEXIBLE MOUNTING OF ELECTRIC MOTORS

BACKGROUND OF THE INVENTION

Various constructions have been used in the past to absorb the torque vibrations of a motor when the main frame of the motor is connected to a blower housing or other motor mounting means. One such arrangement is illustrated in Goettl U.S. Pat. No. 2,615,620 in which the main frame of the motor is encircled by a clamp from which a plurality of circumferentially spaced straightly extending arms project and are secured to a panel by mounting pads. Another type of motor mounting is illustrated in Dochterman, et al. U.S. Pat. No. 3,746,894, in which a rigid elongated member is secured to the motor and extends outwardly therefrom and is connected to a blower housing through a vibration isolater secured to the blower housing. General Electric Company has recently advertized a "Torsion-Flex" mounting system in which three circumferentially spaced brackets are employed which project from the main frame of the motor. The present invention provides compact circumferentially spaced bracket type supports which are welded to the main frame of an electric motor and absorb torque vibrations of the motor in a compact space more effectively than Goettl and the General Electric construction and yet eliminates the many parts of the vibration isolator shown and described in U.S. Pat. No. 3,746,894 such as the soft non-resilient materials there used.

SUMMARY OF THE INVENTION

The flexible motor mounting means of the invention has a plurality of circumferentially spaced brackets which are formed with an integral pad on the inner end having a curvature to conform to the main frame or shell of an electric motor. Each pad is welded to the shell before the motor is assembled and made ready to ship.

An arm on each bracket extends in an arcuate path along the length of the main frame of the motor and the outer end of each arm terminates in a generally short extension extending radially inwardly and then outwardly of the arcuately extending portion of the arm to provide a reverse bend construction in each arm between the terminating portion of the short radial extension and the arcuate portion of each arm. Under this construction the short extension of each arm initially extends radially inwardly toward the main frame of the motor and then turns outwardly on a predetermined radius to locate the terminating portion of the short extension of each arm generally parallel to that portion of the radially inwardly extension of the arm leading to the reverse bend. The outer end of the short radial extension of each arm is integrally provided with a pad normally extending at right angles to the inner pad welded to the motor and the outer pad of each arm may be secured to a blower housing or a panel such as by screws or bolts extending through apertures provided in the outer pads.

Under another embodiment of the invention the reverse bend is followed by an outward curvature in that portion of the bracket arm immediately located ahead of the outer pad to provide for vibration damping but in a more confined space.

The vibration absorbing brackets of the invention may be welded in different positions on the main frame of a motor in the same welding machine. The curved outer pad is suitable for any practical angle of mounting screw application to the housing of a blower. The reverse bend provides additional length to the flexible arm of the bracket thus increasing its ability to flex and isolate vibration of the motor from the housing and the length of the arm is also increased in a confined space when the outward curvature or crimp is provided in that portion of the arm immediately located ahead of the outer pad. The reverse bend design minimizes scrap and lends itself to optional choices of material thickness or temper to facilitate the desired flexibility and the necessary resistance to fatigue. A motor mounted by the reverse bend brackets has maximum flexibility in the twisting mode where the most isolation is required. The reverse bend brackets support the motor close to the center of gravity of the wheel and motor assembly thus improving structural rigidity, minimizing the various torsional vibration modes and consequences, and permits maximum entry of the motor into the blower which improves cooling and reduces overall unit size. In addition, the invention eliminates structural parts and hardward required in previous constructions and the need for soft resilient non-metallic materials to provide a quiet blower unit.

DESCRIPTION OF THE DRAWINGS

FIG. 1 is an elevational view of the brackets of the invention secured to the shell of a motor;

FIG. 2 is an end view taken on Line 2—2 of FIG. 1 illustrating three circumferential spaced brackets secured to a motor and illustrates a portion of a blower housing to which the brackets are secured;

FIG. 3 is an elevational view of a bracket to illustrate the reverse bend; and

FIG. 4 illustrates another embodiment of a bracket with a crimp in the arm outwardly of the reverse bend to provide an even short bracket for use in a confined space.

DETAILED DESCRIPTION OF THE INVENTION

Referring to the drawings there is shown an electric motor having a main frame 1 which is located within the housing 2 of a blower not shown.

The motor is supported within the housing 2 by a plurality of circumferential spaced brackets 3.

Referring to the construction of one of the brackets 3, as the brackets 3 shown in the drawings are of the same construction, brackets 3 has an integrally formed inner pad 4 at the inner end which conforms in curvature to the main frame 1 of the motor, and pad 4 is secured such as by spot or projection welding to main frame 1.

Bracket 3 has an arm 5 which extends outwardly from pad 4 at generally right angles to pad 4 and then in an arcuate path along the length of the main frame 1 of the motor. The arcuate portion of each arm tapers to a lesser dimension as it extends from inner pad 4. The arcuate portion of arm 5 terminates in generally short extensions 6 extending radially towards main frame 1 and then reversing at the reverse bend 7 and providing a portion 8 which extends radially outwardly from frame 1 in a parallel overlapping relationship with extension 6. The portion 8 of bracket 3 terminates in an outer integral pad 9 which is normally provided with an aperture 10 to receive a bolt or screw to secure bracket 3 to the housing 2. Outer pad 9 extends at generally right angles to the inner pad 4.

It has been found that the radius of the curvature of the reverse bend 7 should be approximately ⅛ to 5/32 of an inch to provide the desired flexure in bracket 3 when torque from the motor is applied to bracket 3.

By employing the reverse bend construction the length of arm 5 is extended to provide for effective torque absorption in the nature of a spring within a very confined space between the frame 1 of the electric motor and housing 2.

Another embodiment of the invention is illustrated in FIG. 4 complements the reverse bend 7 by providing a crimp or loop 11 in the brackets 3 there shown which is located outwardly from the reverse bend 7. The crimp 11 has a radius such as approximately 1/16 of an inch and has the effect of extending the length of the arm 8 in a confined space to effectively dampen the torque vibrations of the electric motor.

The invention provides a simple and compact construction to overcome the problem of an electric motor secured within a blower housing.

Various modes of carrying out the invention are contemplated as being within the scope of the following claims particularly pointing out and distinctly claiming the subject matter which is regarded as the invention.

We claim:

1. A flexible mounting for an electric motor for securing the generally cylindrical main frame of the motor to a supporting means and dampen the torsional forces of the motor by a compact construction, which comprises a plurality of circumferentially spaced brackets each having an arm extending in an arcuate path along the length of the main frame of the motor, an inner pad integrally formed on the inner end of each arm and at right angles thereto and of a curvature conforming to the cylindrical shape of the main frame and welded to the main frame of the motor, the outer end of each arm terminates in a generally short extension radially of the arcuately extending portion of each arm, an outer pad integrally formed on the outer end of the generally short extension of the arm and disposed to be secured to the supporting means, and a reverse bend construction provided in each arm between the short radial extension and the arcuate extension whereby the short extension of the arm initially extends radially inwardly toward the main frame of the motor and then turns outwardly on a predetermined radius to provide said terminating portion of the short extension of the arm extending generally parallel to that portion of the radially inwardly short extension of the arm leading to the reverse bend.

2. The flexible mounting of claim 1, in which the supporting means is a blower housing, the arcuate extent of each arm tapers to a lesser width in its path along the side of the main frame, and the radius of the reverse bend being approximately ⅛ to 5/32 of an inch.

3. The flexible mounting of claim 1 and a crimped construction provided in the short extension of each arm between the outer pad and the reverse bend to in effect extend the length of the short arm and additionally improve the dampening effect of the brackets in a limited space.

UNITED STATES PATENT AND TRADEMARK OFFICE
CERTIFICATE OF CORRECTION

PATENT NO. : 4,161,667
DATED : July 17, 1979
INVENTOR(S) : John B. Buckman; Robert E. Lykes It is certified that error appears in the above-identified patent and that said Letters Patent are hereby corrected as shown below:

Column 2, Line 22, Cancel "hardward" and substitute therefor ---hardware---

Column 4, Line 6, After the word "extension" insert ---extending---

Signed and Sealed this

Thirtieth Day of October 1979

[SEAL]

Attest:

RUTH C. MASON
*Attesting Officer*

LUTRELLE F. PARKER
*Acting Commissioner of Patents and Trademarks*